(12) United States Patent
Li et al.

(10) Patent No.: US 8,003,577 B2
(45) Date of Patent: Aug. 23, 2011

(54) METHOD OF TREATING SUBTERRANEAN FORMATION WITH CROSSLINKED POLYMER FLUID

(75) Inventors: Leiming Li, Sugar Land, TX (US); Paul R. Howard, Sugar Land, TX (US); Carlos Abad, Richmond, TX (US); Michael D. Parris, Richmond, TX (US); Lijun Lin, Sugar Land, TX (US); Andrey Mirakyan, Houston, TX (US); Richard D. Hutchins, Sugar Land, TX (US); Baudel William Quintero, Friendswood, TX (US)

(73) Assignee: Schlumberger Technology Corporaton, Sugar Land, TX (US)

( * ) Notice: Subject to any disclaimer, the term of this patent is extended or adjusted under 35 U.S.C. 154(b) by 690 days.

(21) Appl. No.: 11/689,755

(22) Filed: Mar. 22, 2007

(65) Prior Publication Data

US 2008/0234147 A1 Sep. 25, 2008

(51) Int. Cl.
*C09K 8/72* (2006.01)
*C09K 8/60* (2006.01)
*E21B 43/26* (2006.01)
*E21B 43/25* (2006.01)

(52) U.S. Cl. ............... 507/215; 507/219; 166/305.1; 166/307; 166/308.1

(58) Field of Classification Search .......... 507/215, 507/219; 166/305.1, 307, 308.1
See application file for complete search history.

(56) References Cited

U.S. PATENT DOCUMENTS

| 3,795,276 A | 3/1974 | Eilers |
| 3,984,333 A | 10/1976 | van de Kraats |
| 4,498,539 A | 2/1985 | Bruning |
| 4,553,601 A | 11/1985 | Almond et al. |
| 4,749,041 A | 6/1988 | Hodge et al. |
| 4,824,916 A | 4/1989 | Kershner |
| 5,305,832 A | 4/1994 | Gupta |
| 5,559,263 A | 9/1996 | Smith |
| 6,613,720 B1 * | 9/2003 | Feraud et al. ............. 507/200 |
| 2006/0105919 A1 | 5/2006 | Colaco et al. |
| 2006/0166835 A1 | 7/2006 | Yang |
| 2006/0205605 A1 * | 9/2006 | Dessinges et al. ........... 507/211 |
| 2006/0225884 A1 | 10/2006 | Harris et al. |

FOREIGN PATENT DOCUMENTS

| JP | 54149789 A | 11/1979 |
| JP | 2000198975 A | 7/2000 |

* cited by examiner

*Primary Examiner* — Milton I Cano
*Assistant Examiner* — Aiqun Li
(74) *Attorney, Agent, or Firm* — Rachel Greene; David Cate; Jeff Griffin

(57) ABSTRACT

A method of treating a subterranean formation penetrated by a wellbore utilizes a treating fluid formed from an aqueous solution of a water-soluble polymer. The treating fluid further contains a crosslinking agent and an optional delayed release alkaline additive. The delayed release alkaline additive may be at least one of urea, a urea derivative, a solid alkaline earth metal carbonate, a solid alkaline earth metal oxide and combinations of these. The treating fluid further includes an acidic pH adjusting agent used in an amount to provide the treating fluid with a pH of less than about 5. The treating fluid is then introduced into the formation.

17 Claims, 7 Drawing Sheets

METHOD OF TREATING SUBTERRANEAN FORMATION WITH CROSSLINKED POLYMER FLUID

BACKGROUND

This invention relates to fluids used in treating a subterranean formation. In particular, the invention relates to shear resistant crosslinked polymer fluids that contain a water-soluble polymer, a crosslinking agent, and an acidic pH adjusting agent, as well as methods of treating a subterranean formation with such fluids.

The statements in this section merely provide background information related to the present disclosure and may not constitute prior art. In the recovery of hydrocarbons from subterranean formations it is common practice, particularly in low permeability formations, to fracture the hydrocarbon-bearing formation (i.e. to create a fracture or create a less resistance path for the formation fluids) to enhance oil and gas recovery. In such fracturing operations, a fracturing fluid that is capable of suspending a proppant is hydraulically injected into a wellbore that penetrates a subterranean formation. The fracturing fluid is forced against the formation strata by applying sufficient pressure to the extent that the fracturing fluid opens a fracture in the formation. This pressure is then maintained while injecting fracturing fluid at a sufficient rate to further extend the fracture in the formation. As the formation strata or rock is forced to crack and fracture, a proppant is placed in the fracture by movement of a viscous fluid containing proppant into the crack in the rock. After the pressure is reduced, the fracture closes on the proppant, thus preventing complete closure of the fracture. The resulting fracture, with proppant in place, provides improved flow of the recoverable fluid, i.e., oil, gas, or water, into the wellbore.

Natural polymers such as guar and its derivatives have been widely used as gelling agents to prepare viscous fracturing fluids for hydraulic fracturing treatments. These polymers are water soluble polymers. Examples of such water-soluble crosslinkable polymers include guar, hydroxypropyl guar (HPG), carboxymethyl guar (CMG), carboxymethyl hydroxypropyl guar (CMHPG), carboxymethyl cellulose (CMC), etc. For such treatments, the polymer is combined with an aqueous fluid so that the polymer is hydrated to give a linear gel solution and then crosslinked to give a viscous gel solution. Crosslinking may occur instantly or be delayed until the fluid reaches the desired location.

Various fluid systems employing guar and guar derivative polymers are used today that employ crosslinking agents such as zirconium compound crosslinkers. Some typical gelling agents for zirconium crosslinkers include HPG, CMG, and CMHPG. Zirconium based crosslinkers have found widespread application for fracturing fluids used in deep and high temperature reservoirs. Such zirconium crosslinked polymer fluids, however, are known to be shear-sensitive. In particular, high shear can cause the loss of fluid viscosity. The exact mechanism for this degradation is still a matter of debate and the oil and gas production industry has dealt with this shortcoming for many years.

Various methods for addressing the high shear sensitivity of these fluids have been used in the past. Primarily this involves delaying the onset of crosslinking of the fluid so that crosslinking is avoided or retarded in the high-shear (e.g. shear of 500/sec or more) regions, such as is encountered within the tubulars going from the surface to reservoir depth. Once the fluid enters the fracture or low-shear regions (generally 10 to 200/sec), the crosslinking is then initiated. Typical methods of delaying crosslinking include the use of complexing agents, for example bicarbonate or lactate, that allow a ligand exchange of the metal to polymer at an elevated temperatures.

Such delayed crosslinked fluids may be designed for use in high temperature or low temperature environments. In low temperature environments (e.g. less than 121° C.), the pH of the fluid may be lower. A lower starting pH, for example, about 5, contributes to better shear recovery, usually defined as viscosity recovery after shearing, of the fluid. At higher temperatures (e.g. 121° C. or greater) the low pH fluids will deteriorate the viscosity due to polymer instability in low pH and high temperature environments. As a result, in high temperature environments, a starting pH of, for example, above 9, is usually used so that the fluid does not become too acidic to damage the polymer. Such high pH fluids, however, may often exhibit poor shear recovery.

This invention describes the means of avoiding these limitations and providing the methods of generating fracturing fluids that do not suffer irreversible shear degradation.

BRIEF DESCRIPTION OF THE DRAWINGS

For a more complete understanding of the present invention, and the advantages thereof, reference is now made to the following descriptions taken in conjunction with the accompanying figures, in which.

SUMMARY OF THE INVENTION

Figure 1:
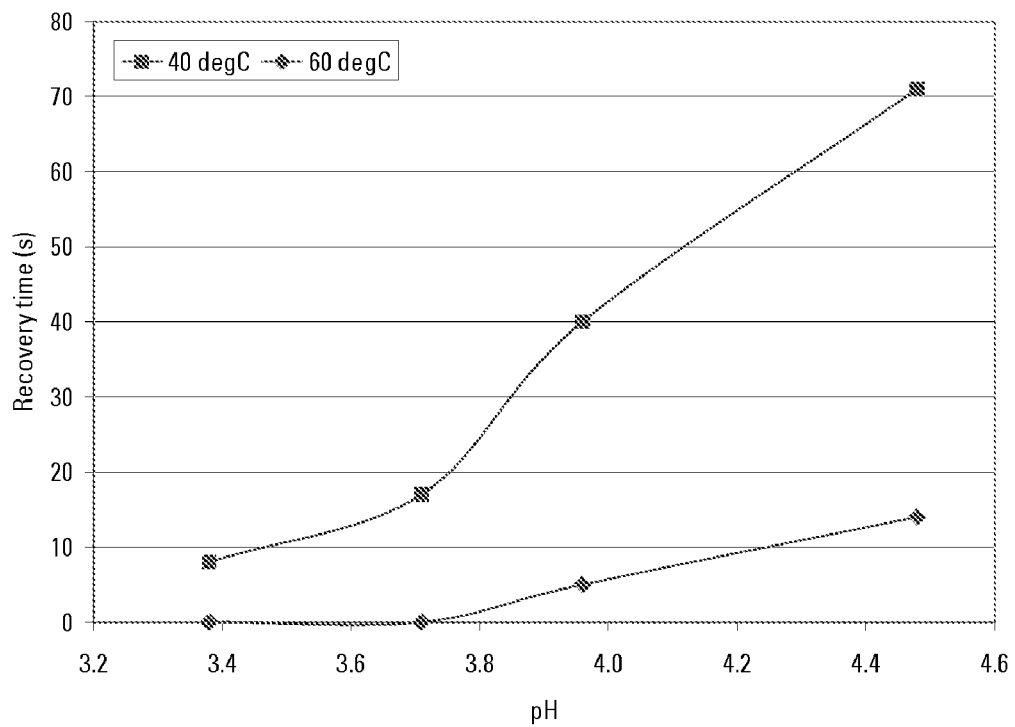
FIG. 1 shows the shear recovery time at different temperatures and pH levels of carboxymethyl hydroxypropyl guar gels.

The invention relates to shear resistant crosslinked polymer fluids that utilize water-soluble polymers, as well as methods of treating a subterranean formation with such fluids. Some embodiments are methods of treating a subterranean formation penetrated by a wellbore using an aqueous fluid formed of a water-soluble polymer, a crosslinking agent, and an acidic pH adjusting agent, where the acidic pH adjusting agent is incorporated into the fluid an amount adequate to provide the fluid with a shear recovery time of 5 minutes or less. Then subsequently, the fluid is introduced into the formation at a pressure sufficient to treat the formation.

Other embodiments of the invention are methods of treating a subterranean formation penetrated by a wellbore performed by forming a treating fluid based upon a water-soluble polymer, a crosslinking agent, and an acidic pH adjusting agent, where the acidic pH adjusting agent incorporated in an amount adequate to provide the fluid with a recovered viscosity ratio of about 0.70 or greater at 10 minutes, and then introducing the treating fluid into the formation.

In yet other embodiments, the fluids are shear resistant fluids containing a water-soluble polymer, a crosslinking agent, and an acid pH adjusting agent, where the acid pH adjusting agent is incorporated in an amount adequate to provide the treating fluid with a pH of less than about 5, a recovered viscosity ratio of about 0.70, and shear recovery time of 5 minutes or less.

Fluids may also optionally contain a delayed release alkaline additive. Such an additive may be urea, a urea derivative, a solid alkaline earth metal carbonate, a solid alkaline earth metal oxide, as well as any combination thereof. The delayed release alkaline additive may function to raise the pH of the treatment fluid to a targeted value at a desired time period after formation of the fluid. The delayed release alkaline additive may be incorporated in an amount from about 0.01% to about 0.5% by weight of fluid. While any suitable alkaline earth metal carbonate or oxide may be used, examples of some suitable materials are $MgCO_3$, $MgO$, $CaCO_3$, $Ca(OH)_2$, $CaO$ and $SrCO_3$.

The acidic pH adjusting agent is typically incorporated in the fluid in amount adequate to provide the treating fluid with a pH of less than about 5, and in some embodiments, adjusted to a pH of from about 3.3 to about 4.5. The acidic pH adjusting agent may be a carboxylic acid, an inorganic acid, or combination of both. Some suitable examples of carboxylic acids include acetic acid, formic acid, propionic acid, glycolic acid, benzoic acid, citric acid, amino acids, p-toluenesulfonic acid, is an oxalic acid, azelaic acid, adipic acid, methane sulfonic acid, and the like. Some suitable examples of inorganic acids include hydrochloric acid, sulfuric acid, nitric acid phosphoric acid, boric acid, and the like.

Fluids of and used according to the invention include a crosslinking agent and water soluble polymer. The crosslinking agent may include a metal compound selected from Zr, B, Ti, Cr, or Hf organo-metallic compounds. Preferably, the crosslinking agent is a zirconium crosslinking agent, and more preferably, zirconium lactate, zirconium tripropanolamine, zirconium diethanolamine and zirconium triethanolamine. While any suitable polymer may be used, nonlimiting examples include guar, hydroxypropyl guar, carboxymethyl guar, carboxymethyl hydroxypropyl guar, carboxymethyl cellulose, hydroxyethylcellulose, hydroxypropylcellulose, carboxymethylhydroxyethylcellulose, xanthan, diutan, scleroglucan, polyacrylamide and polyacrylate. The polymer is present within the treating fluid in an amount of from about 0.1% to about 1.5% by weight of fluid, while the crosslinking agent is used in an amount of from about 0.01% to about 0.15% by weight of fluid.

Fluids and methods of are useful for a range of subterranean applications, including formation stimulation treatments, wellbore cleanout, gravel packing, diversion, fluid loss control, scale removal, diversion, acidizing, matrix treatment, or clean-up.

DETAILED DESCRIPTION

The invention will now be more fully described in the more limited aspects of detailed embodiments thereof including a number of examples which should be considered as illustrative of the concept of the invention. At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The present invention has application to metal crosslinked polymer fluids that utilize water-soluble polymers. While any suitable water-soluble polymers may be used, some nonlimiting examples of such water-soluble polymers are carboxymethyl cellulose (CMC) and the guar-based polymers, such as guar and guar derivatives. Examples of such guar-based polymers include guar, hydroxypropyl guar (HPG), carboxymethyl guar (CMG), carboxymethyl hydroxypropyl guar (CM-HPG), etc. In particular, the water-soluble polymers are carboxyalkyl hydroxyalkyl guar polymers. The carboxyalkyl hydroxyalkyl guar polymers may include those in which the alkyl radicals are selected from methyl, ethyl and propyl radicals. Carboxymethyl hydroxypropyl guar (CMHPG) is particularly useful in forming the crosslinked polymer fluids of the invention. Cellulose derivatives such as hydroxyethylcellulose (HEC) or hydroxypropylcellulose (HPC) and carboxymethylhydroxyethylcellulose (CMHEC) may also be used. Xanthan, diutan, and scleroglucan, three biopolymers, have also been shown to be useful as viscosifying agents. Further, synthetic polymers such as, but not limited to, polyacrylamide and polyacrylate polymers and copolymers may be used. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in U.S. published application US20040209780A1, Harris et al., incorporated herein by reference thereto.

The water-soluble polymer may be present at any suitable concentration. In various embodiments hereof, the gelling agent can be present in an amount of from about 0.1 wt. % to about 1.5 wt. % of total weight of treating fluid, from about 0.1 wt. % to about 0.7 wt. %, from about 0.1 wt. % to about 0.6 wt. %, from about 0.1 wt. % to about 0.5 wt. %, from about 0.1 wt. % to about 0.4 wt. %, from about 0.1 wt. % to about 0.3 wt. %, or from about 0.1 wt. % to about 0.2 wt. % of total weight of treating fluid. Preferably, the water-soluble polymer may be present in an amount of from about 0.1 wt. % to about 0.5 wt. % of total weight of treating fluid. The lower limit of polymer concentration may be about 0.1, 0.2, 0.3, 0.4 or 0.5 wt. % of total weight of treating fluid. Fluids incorporating the polymer may have any suitable viscosity, preferably a viscosity value of about 50 mPa-s or greater at a shear rate of about 100 s-1 at treatment temperature, more preferably about 75 mPa-s or greater at a shear rate of about 100 s-1, and even more preferably about 100 mPa-s or greater. The polymer may be mixed with an aqueous fluid such as water or brine containing 1-2 wt. % KCl.

The crosslinking agent used is a metal compound crosslinking agent. The metal compounds may include Zr, Ti, Cr or Hf organo-metallic compounds. In particular, organo-zirconium and titanium crosslinking agents are useful. Examples of suitable zirconium crosslinking agents include zirconium triethanolamine, zirconium diethanolamine, zirconium tripropanolamine, and zirconium lactate complexes, and/or the related salts, and/or their mixtures. Examples of titanium crosslinking agents include titanium triethanolamine and titanium acetylacetonate. The crosslinking agent may be used in an amount of typically less than about 0.15 wt. %, more particularly less than about 0.1 wt. % of treating fluid, and still more particularly less than about 0.07 wt. % of treating fluid. An example of a suitable range for the crosslinking agent for many applications is from about 0.01 wt. % to about 0.15 wt. %, as well as every possible value along the continuum between about 0.01 wt. % to about 0.15 wt. %. Boron, which is also used to crosslink polymers like guar, is not mentioned here as these boron-crosslinked fluids are widely known to have the property of viscosity recovery after shearing.

It has been observed, that shear resistance and viscosity recovery rate are significantly increased in zirconium-crosslinked fluids employing guar derivatives such as carboxyalkyl hydroxyalkyl guar polymers with the use of an acidic pH adjusting agent. It has also been observed that shear resistance, viscosity recovery rate, and especially high temperature stability are significantly increased in zirconium-crosslinked fluids employing guar derivatives such as carboxyalkyl hydroxyalkyl guar polymers with the use of pH adjusting agent such as an acid and a temperature stabilizing agent such as urea and MgO. The acidic pH adjusting agent may be a carboxylic acid. Examples of suitable carboxylic acids may include acetic acid (HAc), formic acid, propionic acid and glycolic acid. In certain applications, the carboxylic acid may be a non-hydroxy carboxylic acid or a carboxylic acid having no hydroxyl group on the adjacent carbon of the carboxyl group. If a hydroxycarboxylic acid, such as hydroxyacetic acid, is used in combination with a non-hydroxycarboxylic acid, it may be present in an amount of less than about 0.05%, 0.01%, 0.008%, 0.005% or 0.001% by weight of the treatment fluid. Larger amounts of hydroxycarboxylic acids may also be used, however, or the all of the acidic pH adjusting agent may be a hydroxycarboxylic acid. Inorganic acids, such as hydrochloric acid (HCl) and sulfuric acid ($H_2SO_4$), may also be used as the acidic pH adjusting agents.

The acidic pH adjusting agent may be used to adjust the pH of the treating fluid to a pH of less than about 5, more particularly, to a pH of less than about 4.5. One suitable range for the adjusted pH of the treating fluid is from about 3.3 to about 4.5 prior to introduction of the fluid into the formation. As an example, when acetic acid is used to provide the desired pH, from about 0.055 wt. % or less of the acetic acid is usually enough. However, the pH may be adjusted to any suitable value which is less than about 5, such as about 4.0 or less, about 3.5 or less, about 3.0 or less, about 2.5 or less, or even about 2.0 or less. The pH adjuster is usually applied before the crosslinking step to ensure its even dispersion in the fluid.

In certain applications, an agent or additive for achieving delayed pH increase is added to the treating fluid. The delayed alkaline release agent can be temperature or time activated and may include urea or a urea derivative. Non-limiting examples of suitable urea derivatives include 1,3-dimethylurea and 1,1-diethylurea. The urea or urea derivative may be added as a solid or as an aqueous solution.

An alkaline earth metal carbonate or oxide may also be utilized as the agent for achieving delayed pH increase. Non-limiting examples of suitable alkaline earth metal carbonates and oxides include MgO, $MgCO_3$, $CaCO_3$, $Ca(OH)_2$, CaO, $SrCO_3$, etc. Different particle size distributions of these agents can be used for the invention.

In certain applications, urea or a urea derivative may be used as the delayed alkaline release agent. As used herein, the term "urea" may be used to encompass both urea and its derivatives unless otherwise stated or as is readily apparent from its context. The urea or urea derivative may be used in an amount of from about 0.01 wt. % to about 0.5 wt. % of treating fluid, more particularly, from about 0.05 wt. % to about 0.25 wt. %. Urea or its derivatives may be preferred in many applications because it does not change the initial pH of the gels at room temperature or those temperatures commonly encountered at the surface, where the treating fluids are typically formed. Further, an aqueous solution of urea may have a neutral pH of near 7. The urea also has limited reactivity with the gels at room temperature. Urea (or its derivatives) ensures that the fluid pH stays low (3.3-4.5, for example) in the starting stages at low temperatures (room temperature, for example) in order to promote gel shear recovery. Then, as temperature increases as stages progress, urea (or its derivatives) gradually neutralizes the originally acidic fluid, thus protecting polymers from degradation and, therefore, maintaining the fluid viscosity at higher temperatures.

The alkaline earth metal carbonates and oxides may be used in particulate form so that they slowly dissolve or degrade within the fluid, and thus do not immediately react. When used alone, the alkaline earth metal carbonates and oxides may be used in an amount of from about 0.01 wt. % to about 0.5 wt. % of the treating fluid, more particularly, from about 0.02 wt. % to about 0.25 wt. % of the treating fluid. The particle size of the delayed alkaline release agent may vary, but a particle size of about 0.045 mm or less has been found suitable for many applications. This particle size allows for homogeneous dispersion in the fluid while still retaining a delayed release due to slow dissolution. This ensures that the fluid pH stays low (3.3-4.5, for example) in the starting stages at low temperatures (room temperature, for example) in order to prevent shear damage. Then, as temperature increases as stages progress, the alkaline earth metal carbonates or oxides gradually neutralize the originally acidic fluid, thus protecting polymers from degradation and, therefore, retaining the fluid viscosity at higher temperatures. Examples of suitable commercially available MgO delayed alkaline release agent include MagChem20 and MagChem35, as finely ground (particle size of about 0.044 mm or less), available from Martin Marietta.

The alkaline earth metal carbonates and oxides may be used in combination with urea or its derivatives.

The aqueous medium used in the treating fluid may be water or brine containing 1-2 wt. % KCl, for example. In those embodiments of the invention where the aqueous medium is brine, the brine may include an inorganic salt or organic salt. Examples of inorganic salts include alkali metal halides, for example, sodium chloride, potassium chloride. Sodium bromide, potassium bromide, or cesium bromide may also be used. Any mixtures of the inorganic salts may be used as well. The salt may be chosen for compatibility reasons, for example, where the reservoir drilling composition used a particular brine phase and the completion/clean up composition brine phase is chosen to have the same brine phase. The carrier brine phase may also comprise an organic salt, such as tetramethyl ammonium chloride.

The inorganic salts may aid in the development of increased viscosity that is characteristic of preferred fluids. Further, the inorganic salt may assist in maintaining the stability of a geologic formation to which the fluid is exposed. Formation stability, and in particular clay stability (by preventing the migration or swelling of clay particles in reaction to water-base fluid, for example), is achieved at a concentration level of a few percent by weight and as such the density of fluid is not significantly altered by the presence of the inorganic salt unless fluid density becomes an important consideration, at which point, heavier inorganic salts may be used. In many applications a suitable electrolyte is potassium chloride. The electrolyte may be used in an amount of from about 0.01 wt % to about 15.0 wt % of the treating fluid, and more particularly from about 1.0 wt % to about 8.0 wt % of the treating fluid. The above mentioned additives may enhance the salt tolerance of the polymer systems. For example, with the addition of agents like urea and acetic acid, the polymer fluids can easily withstand 10 wt. % salts, such as KCl, KBr, NaCl, NaBr, or the like.

The treating fluid of the invention exhibits increased shear resistance, viscosity recovery rate and/or high temperature stability compared to conventional treating fluids, such as those formed with zirconium-crosslinked carboxyalkyl hydroxyalkyl guar polymers. In particular, the treating fluid may be used in high temperature environments of up to 170° C., 180° C. or more without significant degradation or loss of properties. In particular, treating fluids formed in accordance with the invention may exhibit a shear recovery time of less than or equal to about 5 minutes, 4 minutes, 3 minutes, 2 minutes, 1 minute, or even 30 seconds or less when subjected to a high shear event (such as 1 minute, 2 minutes, 5 minutes, or greater in a Waring blender rotating at 22,000 rpm), that could sufficiently damage or break the gelled treating fluids. Furthermore, such shear recovery may be seen at temperatures of 20° C. or more, and, in particularly at temperatures close to about 180° C. or more, more particularly such shear recovery may be exhibited at temperatures of from 40° C. to 120° C., 150° C., 180° C. or more. Unless otherwise indicated or clear from the context, as used herein, the term "shear recovery" means that the viscosity of the fluid after being subjected to a high shear event is a value that is a substantial fraction of the fluid viscosity prior to the high shear event. Shear recovery may be expressed in terms of a "recovered fluid viscosity ratio" at a given time. The ratio of viscosity after high shear may be at least about 0.70, 0.75, 0.80, 0.85, 0.90, 0.95 or greater, of the viscosity prior to high shear, thus defining a recovered fluid viscosity ratio. To illustrate, where the initial viscosity of the fluid was measured 100 mPa-s at a shear rate of 100 s$^{-1}$@(150° C., and after shearing the fluid in a Waring blender rotating at 22,000 rpm for 2 minutes, the fluid viscosity is 80 mPa-s at a shear rate of 100 s$^{-1}$@(150° C., the recovered fluid viscosity ratio is 0.80.

The polymer solutions are particularly useful as carrier fluids for proppants. The typical proppant size distribution is about 0.42-0.84 mm (~40 mesh to 20 mesh). The proppants may be those that are substantially insoluble in the polymer solution and/or fluids of the formation. Proppant particles carried by the treatment composition remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc.

The concentration of proppant in the composition may be any concentration that is suitable for carrying out the particular treatment desired. For example, the proppant may be used in an amount up to about 1.5 kilograms of proppant added per liter of the composition. Also, any of the proppant particles may be coated with a resin to potentially improve the strength, clustering ability, and flow back properties of the proppant.

A fiber component may be included in compositions of the invention to achieve a variety of properties including improving particle suspension, and particle transport capabilities, and foam stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like. When used in compositions of the invention, the fiber component may be include at concentrations from about 1 to about 15 grams per liter of the composition, more particularly the concentration of fibers may be from about 2 to about 12 grams per liter of composition, and more particularly from about 2 to about 10 grams per liter of composition.

The compositions may also include a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself.

Embodiments of the invention may further contain other additives and chemicals that are known to be commonly used in oilfield applications by those skilled in the art. These include, but are not necessarily limited to, materials such as surfactants, breakers, high temperature fluid stabilizers (e.g. sodium thiosulfate), oxygen scavengers, alcohols (e.g. isopropanol), scale inhibitors, corrosion inhibitors, fluid-loss additives, bactericides, clay stabilizers, and the like. Surfactants or surface active agents may be added to the fluid to facilitate clean up of fracturing fluid after treatment. Also, surfactants may be included to optimize viscosity or to minimize the formation of stable emulsions that contain components of crude oil or other polymers. In the case of high bottomhole static temperature (>95° C.), additional high temperature stabilizer may be added to prevent oxidation or radical reaction, which may reduce fluid viscosity.

Compositions according to the invention may be foamed and energized well treatment fluids which contain "foamers," which may include surfactants or blends of surfactants that facilitate the dispersion of a gas into the composition to form of small bubbles or droplets, and confer stability to the dispersion by retarding the coalescence or recombination of such bubbles or droplets. Foamed and energized fluids are generally described by their foam quality, i.e. the ratio of gas volume to the foam volume. If the foam quality is between 52% and 95%, the fluid is conventionally called a foamed fluid, and below 52%, an energized fluid. Hence, compositions of the invention may include ingredients that form foams or energized fluids, such as, but not necessarily limited to, foaming surfactant, or blends of surfactants, and a gas which effectively forms a foam or energized fluid. Suitable examples of such gases include carbon dioxide, nitrogen, or any mixture thereof.

In most cases, the fluids of the invention are used in hydraulic fracturing treatments. Hydraulic fracturing consists of pumping a proppant-free composition, or pad, into a well faster than the composition can escape into the formation so that the pressure rises and the rock breaks, creating artificial fractures and/or enlarging existing fractures. Then, proppant particles are added to the composition to form a slurry that is pumped into the fracture to prevent it from closing when the pumping is ceased and fracturing pressure declines. The proppant suspension and transport ability of the treatment base composition traditionally depends on the viscosity of the fluid. Techniques for hydraulically fracturing a subterranean formation are known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein.

In the fracturing treatment, compositions of the present invention may be used in the pad treatment, the proppant stage, or both. The components are mixed on the surface. A gas component, such as carbon dioxide or nitrogen, may also be added to the treating fluid. The gas could be pumped down the annular to mix downhole, or vice versa, to form a foam or energized fluid composition. The foamed or energized fluid may facilitate the proppant being stably transported downhole.

In another embodiment, the compositions may be used for gravel packing a wellbore. As a gravel packing composition, it may contain gravel or sand and other optional additives such as filter cake clean up reagents such as chelating agents or acids (e.g. hydrochloric, hydrofluoric, formic, acetic, citric acid), corrosion inhibitors, scale inhibitors, biocides, leak-off control agents, among others. For this application, suitable gravel or sand is used typically having a mesh size between 0.2 mm (~70 mesh) and 2.4 mm (~8 mesh).

Methods and fluids of the invention may be used to perform subterranean and/or wellbore operations. Such operations include, but are not necessarily limited to stimulation treatments, scale removal, diversion, cleanout, acidizing, scale removal, gravel packing, matrix acidizing, and the like. Stimulation treatments fall into two main groups, hydraulic fracturing treatments and matrix treatments. Fracturing treatments are performed above the fracture pressure of the reservoir formation and create a highly conductive flow path between the reservoir and the wellbore. Matrix treatments are performed below the reservoir fracture pressure and generally are designed to restore the natural permeability of the reservoir following damage to the near-wellbore area.

The following examples further serve to illustrate the invention, and should not be construed to limit the scope of the invention, unless otherwise expressly indicated in the appended claims. All percentages, concentrations, ratios, parts, etc. are by weight unless otherwise noted or apparent from the context of their use.

EXAMPLES

Example 1

Various aqueous polymer gel fluids were prepared. The gels were prepared with about 0.48 wt. % carboxymethyl hydroxypropyl guar (CMHPG) in 2 wt. % KCl-water while stirring. After full hydration, acetic acid (HAc) was added to the fluid to decrease its pH value to 3.3-4.5. The fluid was crosslinked with about 0.07-0.1 wt. % of the zirconium triethanolamine crosslinker. It was noted that the gelation time was usually shorter when the fluid pH was lower at room temperature (~20° C.) and/or when the fluid temperature was higher.

Example 2

The aqueous polymer gel fluids were prepared as described in Example 1. Heating of the fluids in a microwave oven was used in certain cases to hasten gelation. The resistance of the gels to large shear produced in a high speed Waring blender was qualitatively observed. The gels (about 125 ml) from Example 1 were blended in a Waring commercial blender (1 liter), with the model number of 51BL31 (7011), at its maximum speed of 22,000 rpm for 1-10 minutes. The gels appeared to be a liquid during the blending, but could recover to a viscous gel after the blender was stopped. Depending on the pH value and temperature of the fluid (gel), the recovery time could range from seconds or less for lower pH (below 3.6, for example) to over 1 minute for higher pH. FIG. 1 shows representative curves relating to the recovery time with fluid pH and temperature for the gels crosslinked with 0.07 wt. % of the zirconium triethanolamine crosslinker and pH adjusted with HAc. The recovery time was significantly influenced by fluid pH and temperature. Lower pH and/or higher fluid temperature usually translated into shorter recovery time.

A control gel sample (gelation hastened with microwave heating, gel pH: ~7) was prepared with the same procedure described above but without the addition of HAc. The control gel did not survive the same 10-minutes Waring blending at 22,000 rpm, and remained a liquid afterwards. Re-heating the liquid did not produce re-gelling in the liquid. When the same strength (concentration) of HAc was added to the control sample after it was blended (sheared) irreversibly into a liquid, it, however, re-gelled. It is apparent that HAc facilitates shear recovery of CMHPG gels.

Example 3

The effect of shear history generated by a shear history simulator on the viscosity of the CMHPG gel was investigated. To prepare the gels, a fluid containing about 0.48 wt. % CMHPG was doped with about 0.1 wt. % the proprietary corrosion inhibitor for organic acids that was found to be compatible with the claimed gels. HAc was then applied to lower the fluid pH to 3.4-3.5. The crosslinker was 0.07 wt. % of the zirconium triethanolamine crosslinker. Prior to viscosity measurements in a Fann 50 viscometer at 54° C., the gel was sheared at 675/s at room temperature (RT) in a shear history simulator connected directly to the Fann 50 viscometer, while the control sample was not subjected to shearing in the simulator. In Fann 50 viscometer measurements, API RP 39 testing procedure was performed on the fluids with R1-B5 configuration for 2 hours, at a pressure of 2.76 MPa.

The API RP 39 procedure consists of continuous fluid shearing at 100/s and a series of shearing ramps at 100, 75, 50, 25, 50, 75, and 100/s (with a dwell of 30 seconds for each shear rate) once the fluid temperature is within 3° C. of the target test temperature and occurring periodically for every 30 minutes. The shear rate is at 100/s during heat-up and in between shear rate ramps. The average shear stress at each shear rate is estimated and the power law fluid model is applied to fit the data.

Figure 2:
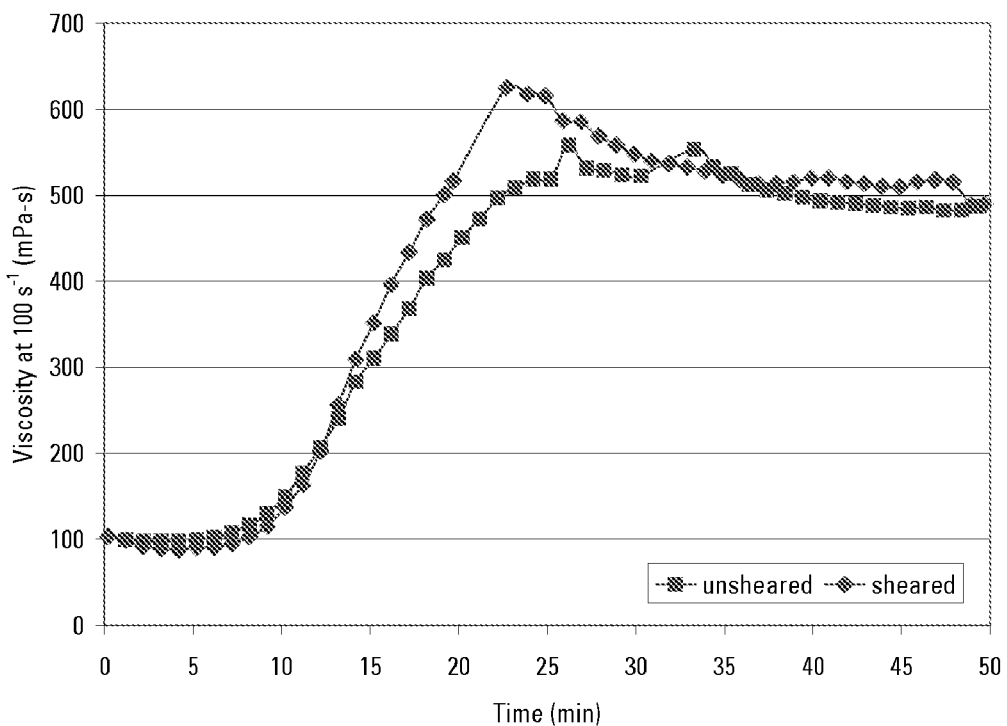
FIG. 2 shows the viscosity over time at 54° C. of crosslinked fluids with (sheared) and without (unsheared) shear history.

FIG. 2 shows that the shearing in the simulator does not alter the viscosity behavior of the gel at 54° C.

Example 4

Figure 3:
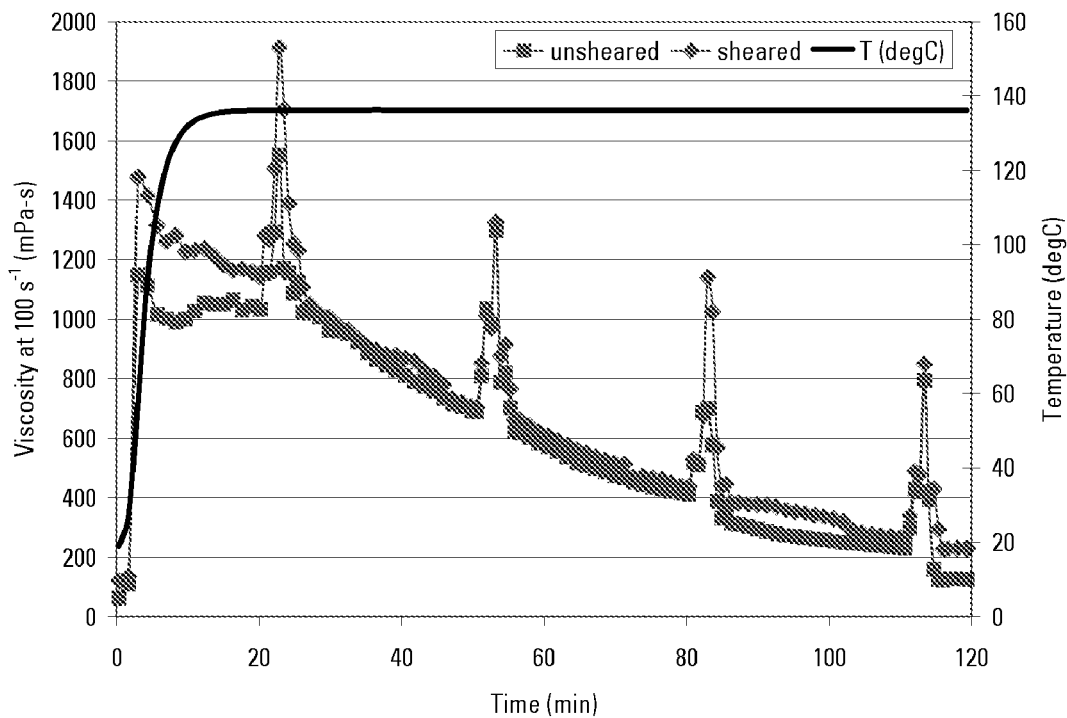
FIG. 3 shows the viscosity over time of sheared and unsheared crosslinked fluids wherein acetic acid is utilized to lower fluid pH.

The shear resistance of the gels sheared in a high speed blender was investigated with a Fann 50 viscometer. Gels were prepared with 2 wt. % KCl, 0.48 wt. % CMHPG, 0.12 wt. % sodium thiosulfate pentahydrate, and 0.24 wt. % urea, and crosslinked with 0.1 wt. % the zirconium triethanolamine crosslinker. HAc was used to adjust the fluid pH value to about 3.9. The control gel (same gel) was sheared in the Waring blender at 22,000 rpm for 2 minutes. As shown in FIG. 3, the sheared and unsheared gels show similar viscosity curves in Fann 50 viscometer at 135° C. The rheological behavior of the gel is, therefore, not significantly changed by the high speed blending, which indicates the gel is not sensitive to high shearing. After the Fann 50 viscometer measurements, both samples were still gels when they were taken out at a fluid temperature of about 38° C.

Example 5

Figure 4:
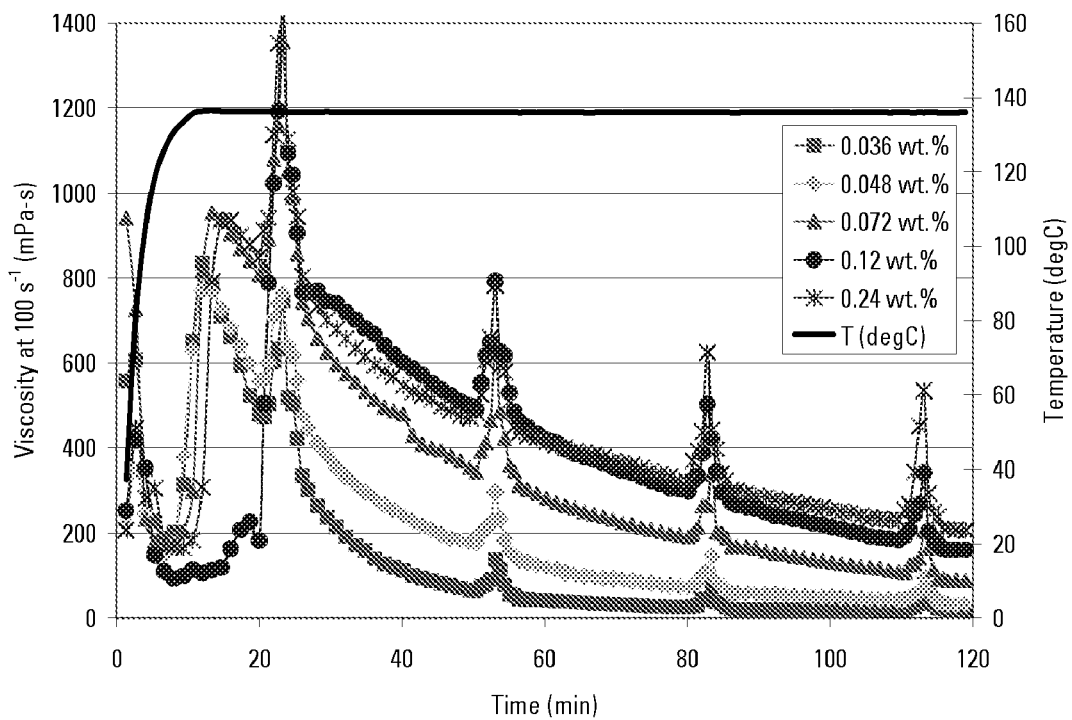
FIG. 4 shows the viscosity over time of various crosslinked fluids utilizing a urea additive in different amounts.

Urea was added in the CMHPG gels to enhance their high temperature performance. The CMHPG gels contained 2 wt. % KCl, 0.48 wt. % CMHPG, and 0.12 wt. % sodium thiosulfate pentahydrate. Urea at 0.036 wt. %, 0.048 wt. %, 0.072 wt. %, 0.12 wt. %, or 0.24 wt. % was then added to the gels. HAc was used to lower the fluid pH to about 4.0. The crosslinker used was 0.1 wt. % the zirconium triethanolamine. Fann 50 viscometer viscosity measurements were carried out at 135° C. As shown in FIG. 4, urea starts to function at 10-20 minutes when the fluid temperature approaches 135° C. With the urea concentration of 0.072 wt. % or higher, the viscosity remains above 100 mPa·s for almost 2 hours at 135° C. It thus appears that higher concentrations of urea can further improve the viscosity profile.

Example 6

Figure 5:
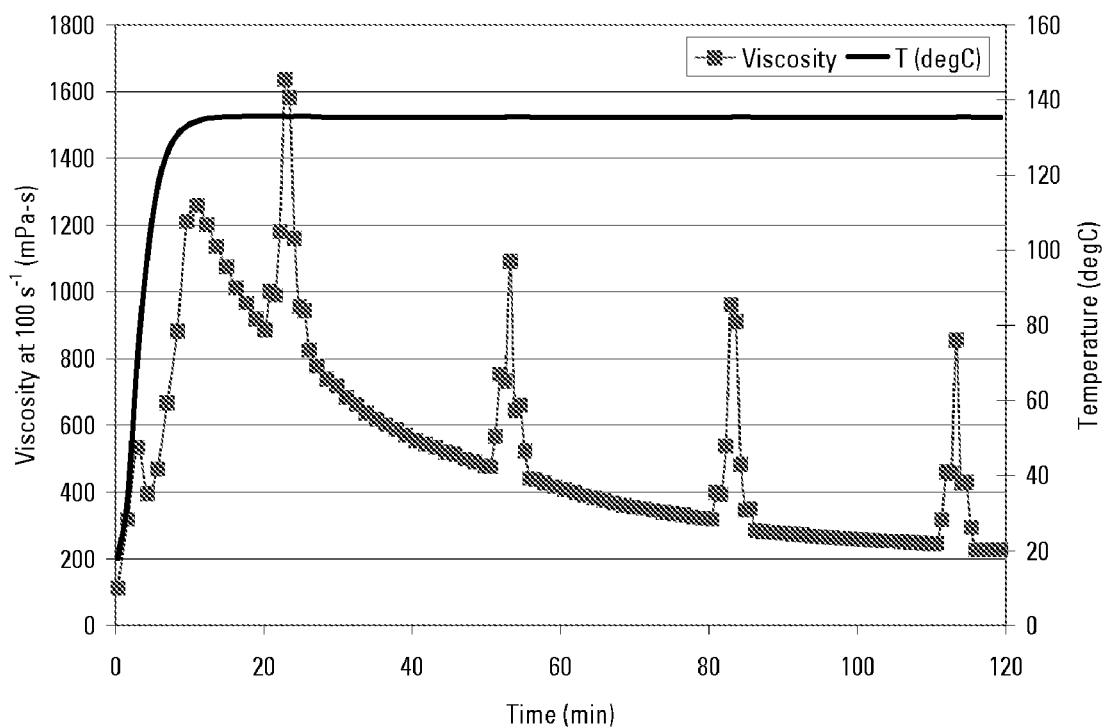
FIG. 5 shows the viscosity over time of a crosslinked fluid utilizing a 1,1-diethylurea additive.

Other urea derivatives, including but not limited to 1,3-dimethylurea and 1,1-diethylurea, showed comparable function as urea in the fluids. As an example, a 1,1-diethylurea-containing gel was made up of 2 wt. % KCl, 0.48 wt. % CMHPG, 0.12 wt. % sodium thiosulfate pentahydrate, and 0.24 wt. % 1,1-diethylurea, and crosslinked with 0.07 wt. % the zirconium triethanolamine crosslinker. HAc was used to lower the fluid pH to about 4.0. FIG. 5 shows that the gel has similar viscosity performance as the urea-containing gels at 135° C.

Example 7

Figure 6:
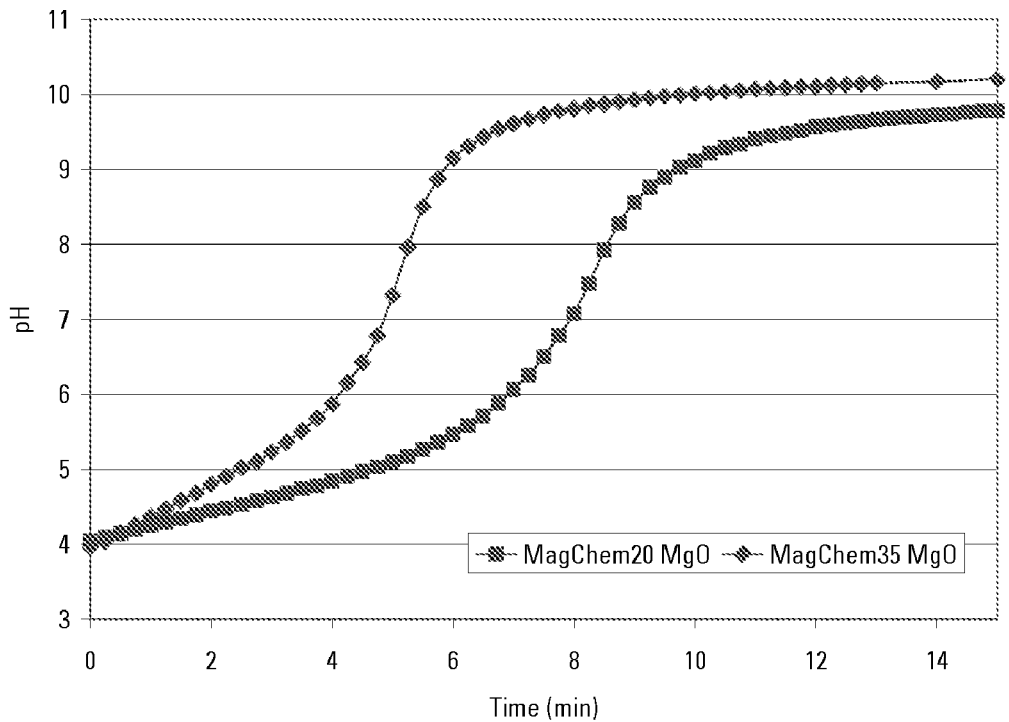
FIG. 6 shows the pH over time of an uncrosslinked polymer solution utilizing a MgO additive.

An alkaline earth metal carbonate or oxide can be utilized as the agent for achieving delayed pH increase. The alkaline earth metal carbonates and oxides may be used in particulate form so that they slowly dissolve or degrade within the fluid, and thus do not immediately react. Fluids were prepared with 2 wt. % KCl and 0.36 wt. % CMHPG, with a pH adjusted to about 4. About 0.036 wt. % MagChem20 or MagChem35, the finely ground (particle size of about 0.044 mm or less) MgO powders purchased from Martin Marietta, was then added and stirred. FIG. 6 shows that the fluid pH slowly changes over time of a fluid utilizing MagChem20 or MagChem35 MgO additive. Similar results were obtained for $MgCO_3$ and $Ca(OH)_2$ powders.

Example 8

Figure 7:
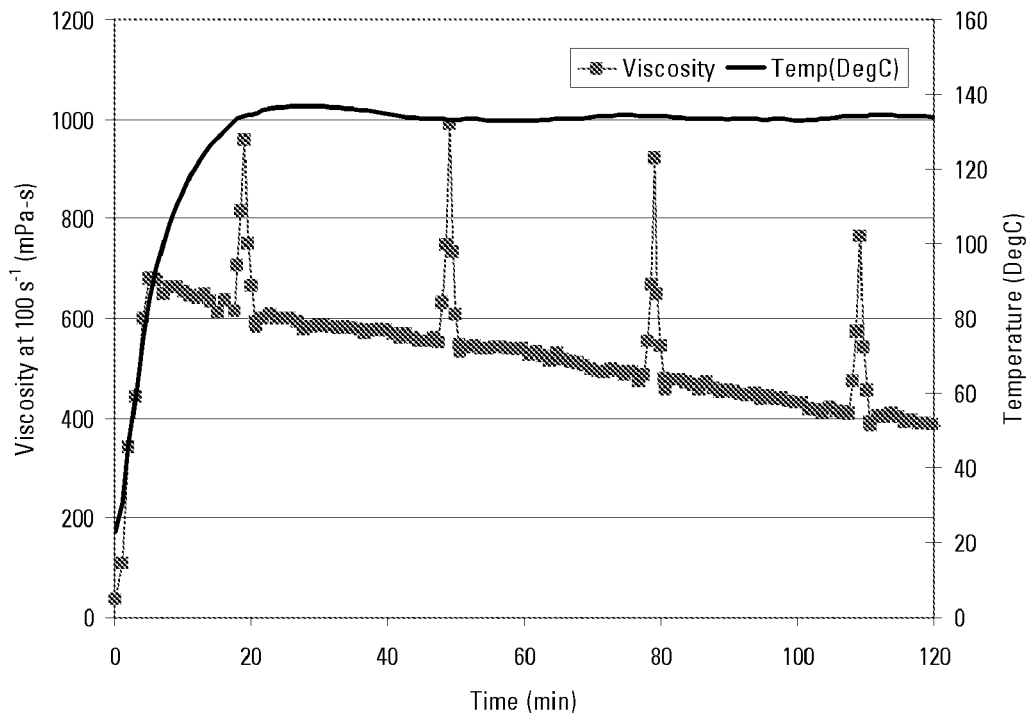
FIG. 7 shows the viscosity over time of a crosslinked fluid utilizing a MgO additive.

An alkaline earth metal carbonate or oxide in particulate form can be utilized as the agent for achieving delayed pH increase. Gels were prepared with 2 wt. % KCl and 0.36 wt. % CMHPG, with a pH adjusted to about 4. About 0.036 wt. % MagChem20 (particle size of about 0.044 mm or less) MgO powders, was then added. The gels were crosslinked with 0.1 wt. % the zirconium lactate crosslinker. FIG. 7 shows that the gel viscosity remains well above 100 mPa·s for over 2 hours at 135° C.

Example 9

Figure 8:
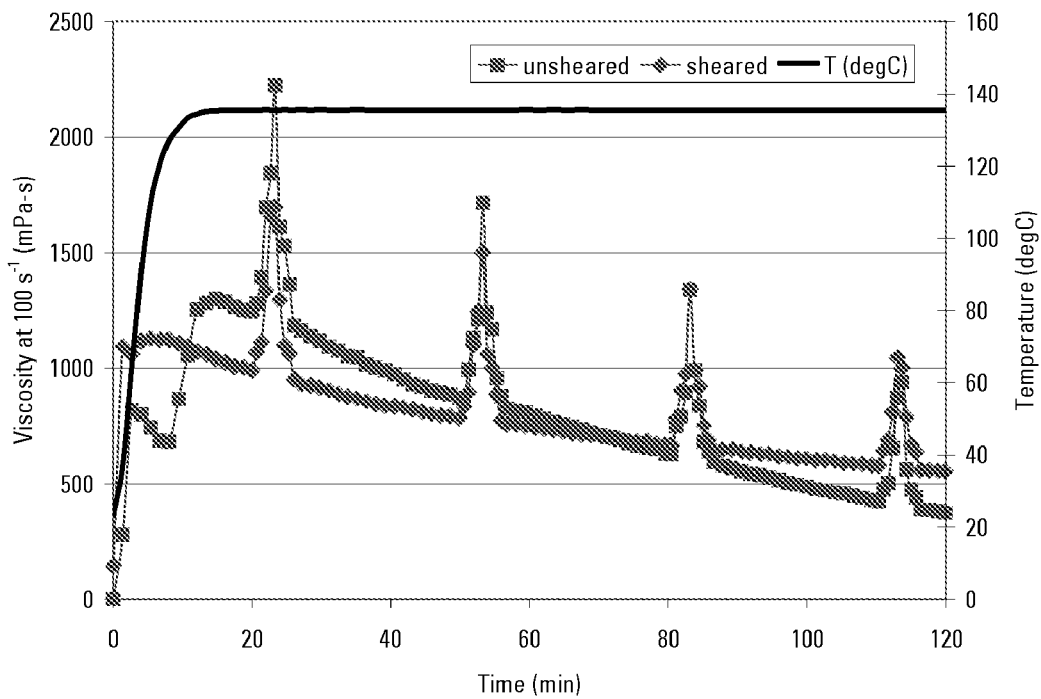
FIG. 8 shows the viscosity over time of sheared and unsheared crosslinked fluids utilizing both $MgCO_3$ and urea additives.

To test the compatibility between alkaline earth metal carbonate or oxide, such as $MgCO_3$, and urea (or urea derivatives), a small amount of $MgCO_3$ was added to the urea-containing gels. CMHPG fluids at 0.48 wt. % were prepared with 2 wt. % KCl, 0.12 wt. % sodium thiosulfate pentahydrate, and 0.12 wt. % urea. HAc was applied to lower the fluid pH to 3.9. About 0.036 wt. % $MgCO_3$ was then added, which was immediately followed by 0.1 wt. % the zirconium triethanolamine crosslinker as the crosslinker. Microwave heating was used to accelerate the gelation process in the fluids. One gel was blended at a speed of 22,000 rpm for approximately 2 minutes. Another gel was not sheared to act as a control. Both were placed in a Fann 50 viscometer for viscosity measurements at 135° C. As shown in FIG. 8, the addition of $MgCO_3$ does not adversely alter the overall viscosity throughout the 2-hour Fann 50 viscometer measurements at 135° C. After Fann 50 viscometer measurements, both fluids retained gel conformation.

Example 10

Figure 9:
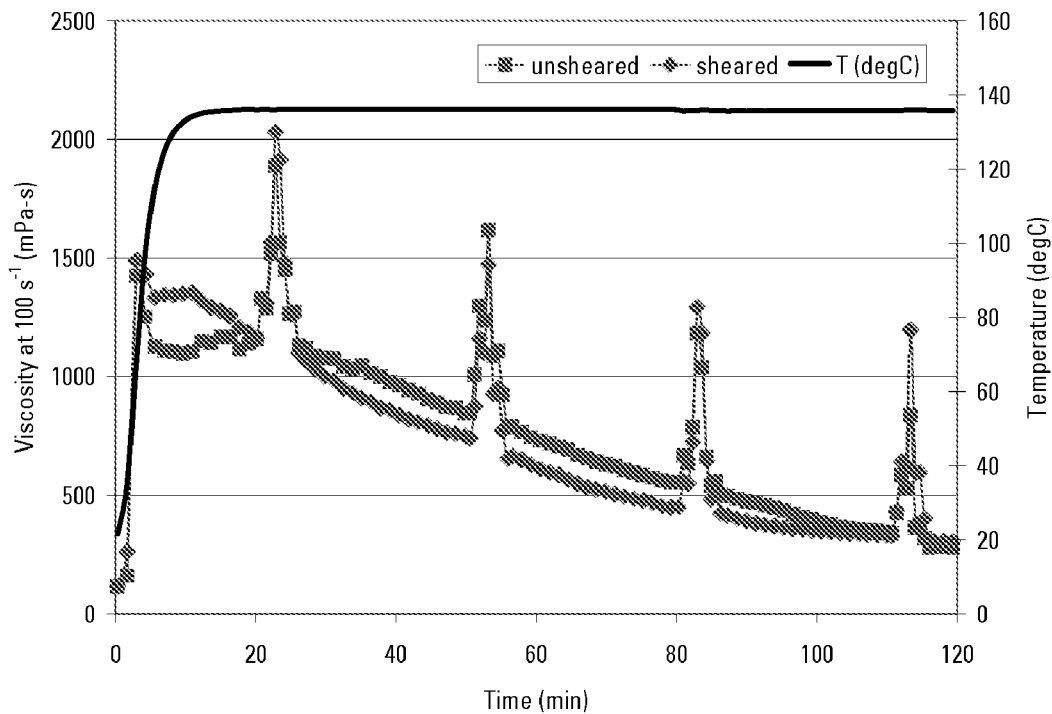
FIG. 9 shows the viscosity over time of sheared and unsheared crosslinked fluids wherein a formic acid additive is utilized to lower fluid pH.

Formic acid was used instead of HAc to lower the fluid pH in forming the gels. Gels were prepared with 2 wt. % KCl, 0.48 wt. % CMHPG, 0.12 wt. % sodium thiosulfate pentahydrate, and 0.24 wt. % urea, and crosslinked with 0.1 wt. % the zirconium triethanolamine crosslinker. Formic acid was used to adjust the fluid pH value to about 3.9. The control gel (same gel) was sheared in the Waring blender at 22,000 rpm for 1 minute. As shown in FIG. 9, the sheared and unsheared gels show similar viscosity, both above 100 mPa·s for over 2 hours, in Fann 50 viscometer at 135° C.

Example 11

Figure 10:
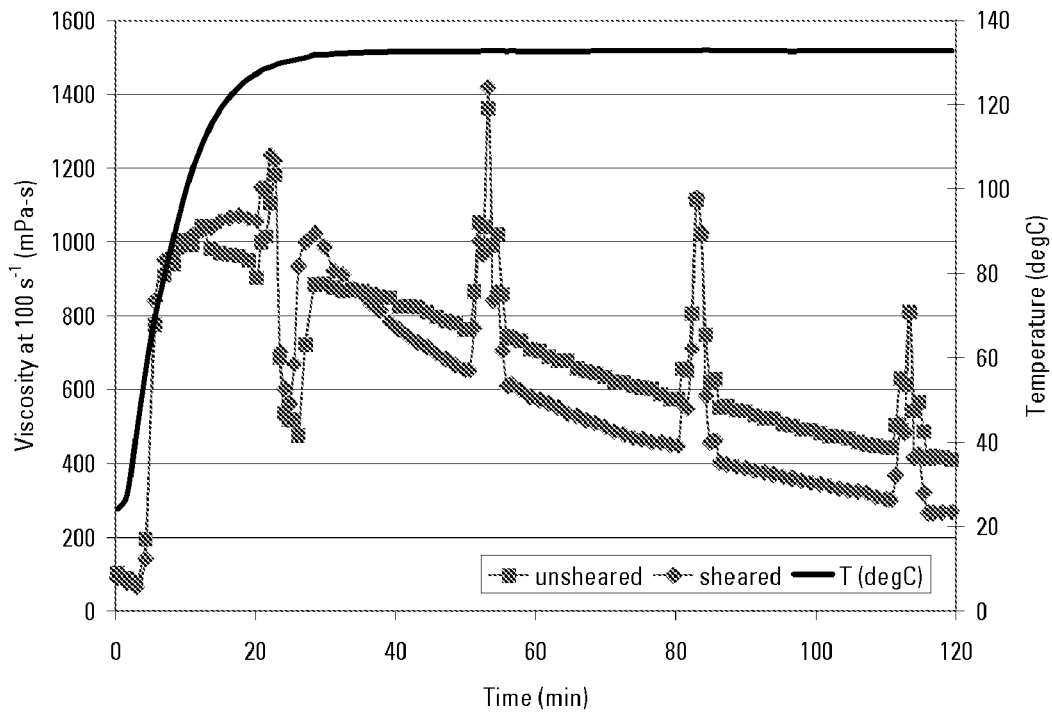
FIG. 10 shows the viscosity over time of sheared and unsheared crosslinked fluids, wherein a glycolic acid additive is utilized to lower fluid pH.

Glycolic acid was used instead of HAc to lower the fluid pH in forming the gels. Gels were prepared with 2 wt. % KCl, 0.48 wt. % CMHPG, 0.12 wt. % sodium thiosulfate pentahydrate, and 0.24 wt. % urea, and crosslinked with 0.1 wt. % the zirconium triethanolamine crosslinker. Glycolic acid was used to adjust the fluid pH value to about 4.1. The control gel (same gel) was sheared in the Waring blender at 22,000 rpm for 1 minute. As shown in FIG. 10, the sheared and unsheared gels show similar viscosity, both above 100 mPa·s for over 2 hours, in Fann 50 viscometer at 135° C.

Example 12

Figure 11:
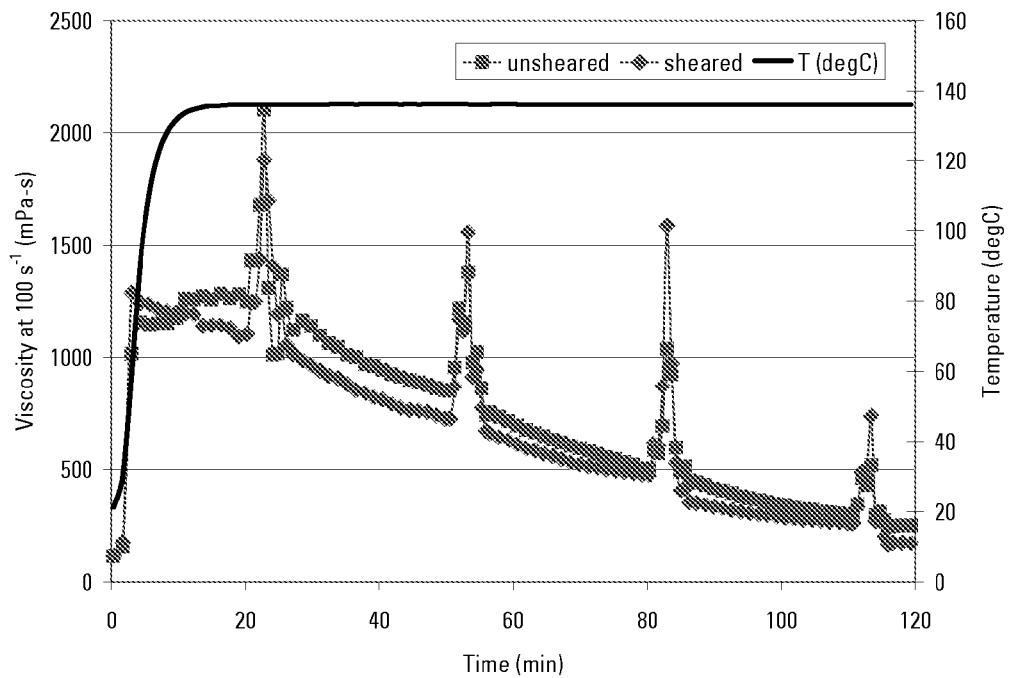
FIG. 11 shows the viscosity over time of sheared and unsheared crosslinked fluids wherein a hydrochloric acid additive is utilized to lower fluid pH.

Hydrochloric acid (HCl) was used instead of HAc to lower the fluid pH in forming the gels. Gels were prepared with 2 wt. % KCl, 0.48 wt. % CMHPG, 0.12 wt. % sodium thiosulfate pentahydrate, and 0.24 wt. % urea, and crosslinked with 0.1 wt. % the zirconium triethanolamine crosslinker. HCl was used to adjust the fluid pH value to about 3.9. The control gel (same gel) was sheared in the Waring blender at 22,000 rpm for 1 minute. As shown in FIG. 11, the sheared and unsheared gels show similar viscosity, both above 100 mPa·s for over 2 hours, in Fann 50 viscometer at 135° C. In a related experiment, a similar gel was prepared but without the addition of urea. The gel quickly decayed to below 100 mPa·s in less than 18 minutes at 135° C.

Example 13

Figure 12:
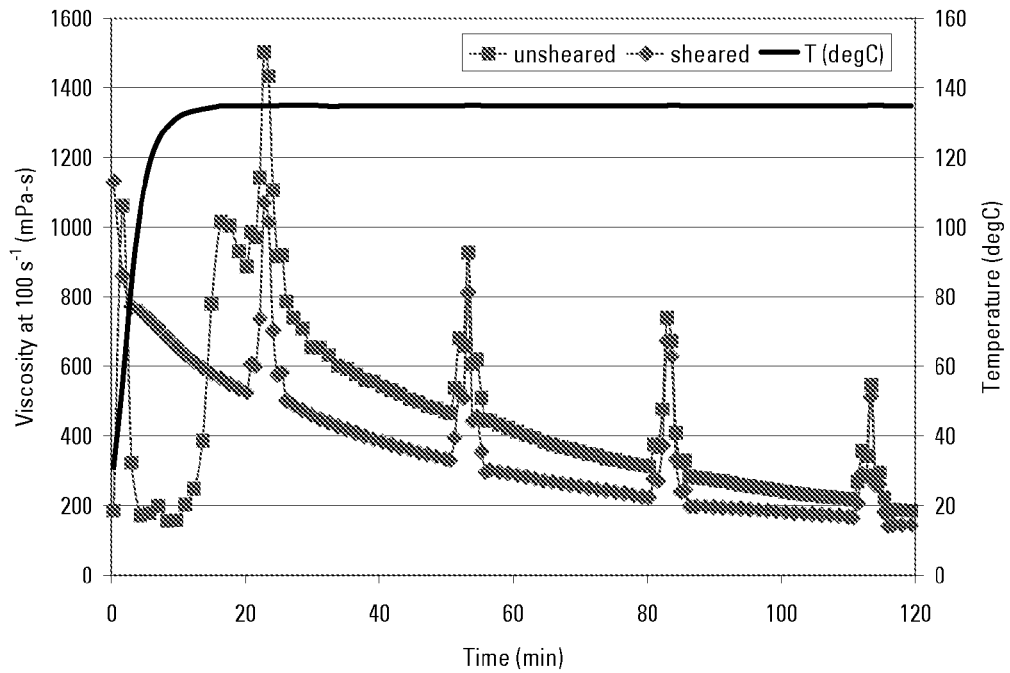
FIG. 12 shows the viscosity over time of sheared and unsheared crosslinked fluids utilizing a urea additive and employing 7 wt. % KCl.

To evaluate the influence of high salt content, gels using 0.48 wt. % CMHPG were prepared having 7 wt. % KCl salt. The gels also contained 0.12 wt. % sodium thiosulfate pentahydrate and 0.24 wt. % urea, and were crosslinked with 0.1 wt. % of zirconium triethanolamine crosslinker. The pH of these gels was adjusted to about 4 with HAc. FIG. 12 shows the gel containing 7 wt. % KCl retained its viscosity at above 200 mPa·s at 135° C. for at least 2 hours. Another gel (same gel), even after subjected to 1 minute of high shear in the Waring blender at 22,000 rpm, retained a viscosity of about 75% that of the unsheared gel at 2 hours at the same temperature of 135° C. The gels were also found to tolerate similar percentages of NaCl at similar temperatures.

Example 14

Figure 13:
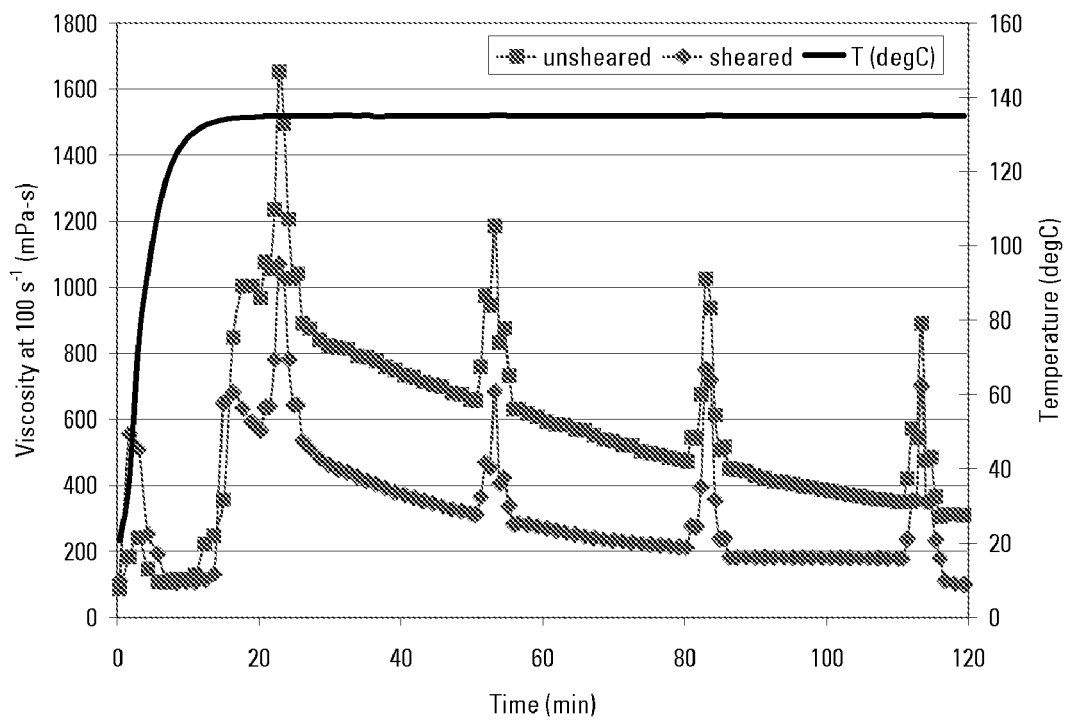
FIG. 13 shows the viscosity over time of sheared and unsheared crosslinked fluids utilizing a urea additive and employing 10 wt. % KCl.

To evaluate the influence of high salt content, gels using 0.48 wt. % CMHPG were prepared having 10 wt. % KCl salt. The gels also contained 0.12 wt. % sodium thiosulfate pentahydrate and 0.24 wt. % urea, and were crosslinked with 0.1 wt. % of zirconium triethanolamine crosslinker. The pH of these gels was adjusted to about 4 with HAc. FIG. 13 shows the gel containing 10 wt. % KCl retained its viscosity at above 200 mPa·s at 135° C. for at least 2 hours. Another gel (same gel), after subjected to 1 minute of high shear in the Waring blender at 22,000 rpm, retained a viscosity of about 50% that of the unsheared gel at 2 hours at the same temperature of 135° C. The gels were also found to tolerate similar percentages of KBr, NaCl and NaBr at similar temperatures. From the results, it seems apparent that the gels can withstand even higher salt content of greater than 10 wt. %.

Example 15

Figure 14:
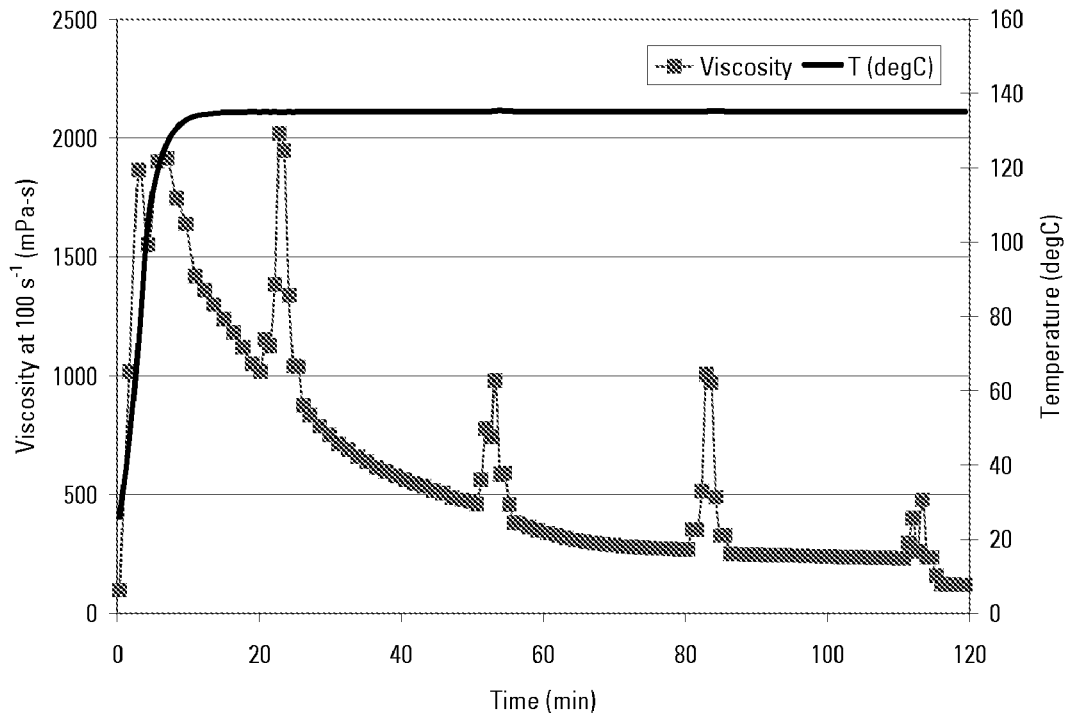
FIG. 14 shows the viscosity over time of crosslinked fluids utilizing tetramethyl ammonium chloride.

Gels were prepared using tetramethyl ammonium chloride in place of KCl. Aqueous gels containing 0.48 wt. % CMHPG, 0.12 wt. % sodium thiosulfate pentahydrate, 0.2 wt. % tetramethyl ammonium chloride solution, and 0.24 wt. % urea, were crosslinked with 0.1 wt. % the zirconium triethanolamine crosslinker. The tested gels had a pH of about 4.0 adjusted with HAc. FIG. 14 shows that the viscosity of the gels stay above 100 mPa·s for over 2 hours at 135° C., comparable to similar gels where the 0.2 wt. % tetramethyl ammonium chloride solution is replaced with 2 wt. % KCl.

Example 16

To evaluate the use of the gels with a foaming agent such as $CO_2$ or $N_2$, an aqueous gel was prepared with 2 wt. % KCl and 0.48 wt. % CMHPG. The $CO_2$ foaming agent, at a concentration of 0.6 wt. %, was then added, followed by 32 wt. % of proppant (high strength ceramic proppant, with a size of about 0.42-0.84 mm) and 0.1 wt. % of zirconium triethanolamine crosslinker. The final pH of the fluid was adjusted with HAc to about 3.44, lower than the usual pH value of about 4 in order to simulate the potential pH drop due to the addition of $CO_2$. The fluid was blended in the Waring blender at high speed to generate bubbles in the gel. The gel had a foam quality (ratio of gas volume to foam volume) of near 50%, and the proppant was evenly and stably distributed throughout the volume of the foamed fluid for several days.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of treating a subterranean formation penetrated by a wellbore comprising:
    forming a treating fluid comprising
        an aqueous solution of a water-soluble polymer, a crosslinking agent, and
        an acidic pH adjusting agent,
        the acidic pH adjusting agent incorporated in an amount adequate to provide the
        fluid with a shear recovery time of 5 minutes or less; and,
    introducing the treating fluid into the formation at a pressure sufficient to treat the formation.

2. The method of claim 1, wherein the fluid further comprises a delayed release alkaline additive of at least one of urea, a urea derivative, a solid alkaline earth metal carbonate, a solid alkaline earth metal oxide and combinations thereof.

3. The method of claim 1, wherein the acidic pH adjusting agent used in an amount to provide the treating fluid with a pH of less than about 5.

4. The method of claim 1, wherein the crosslinking agent includes a metal compound selected from Zr, Ti, Cr, or Hf organo-metallic compounds.

5. The method of claim 2, wherein the delayed release alkaline additive is used in an amount of from about 0.01% to about 0.5% by weight of fluid.

6. The method of claim 1, wherein the crosslinking agent is a zirconium crosslinking agent.

7. The method of claim 1, wherein the acidic pH adjusting agent is selected from at least one of a carboxylic acid and an inorganic acid, and wherein the carboxylic acid includes acetic acid, formic acid, propionic acid and glycolic acid and the inorganic acid includes hydrochloric acid and sulfuric acid.

8. The method of claim 1, wherein the water-soluble polymer is a carboxyalkyl hydroxyalkyl guar polymer, and wherein the alkyl radicals of the carboxyalkyl hydroxyalkyl guar polymer are selected from methyl, ethyl and propyl radicals.

9. The method of claim 8, wherein the carboxyalkyl hydroxyalkyl guar polymer is carboxymethyl hydroxypropyl guar.

10. The method of claim 1, wherein the water-soluble polymer is selected from at least one of hydroxyethylcellulose, hydroxypropylcellulose, carboxymethylhydroxyethylcellulose, xanthan, diutan, scleroglucan, polyacrylamide and polyacrylate.

11. The method of claim 1, wherein the alkaline earth metal carbonate or oxide is selected from at least one of $MgCO_3$, $MgO$, $CaCO_3$, $Ca(OH)_2$, $CaO$ and $SrCO_3$.

12. The method of claim 1, wherein the polymer is present within the treating fluid in an amount of from about 0.1% to about 1.5% by weight of fluid.

13. The method of claim 1, wherein the crosslinking agent is used in an amount of from about 0.01% to about 0.15% by weight of fluid.

14. The method of claim 1, wherein the treating fluid is adjusted to a pH of less than about 4.5.

15. The method of claim 1, wherein the treating fluid exhibits a shear recovery time of less than 5 minutes when subjected to a shear sufficient to break the crosslinked polymer treatment fluid at a temperature of from about 40° C. to about 180° C.

16. The method of claim 1 as used for formation stimulation treatments, wellbore cleanout, gravel packing, diversion, fluid loss control, scale removal, diversion, acidizing, matrix treatment, or clean-up.

17. A method of treating a subterranean formation penetrated by a wellbore comprising:
  forming a treating fluid comprising
    an aqueous solution of a water-soluble polymer, a crosslinking agent, and an
    acidic pH adjusting agent,
    the acidic pH adjusting agent incorporated in an amount adequate to provide the
    fluid with a recovered viscosity ratio of about 0.70 or greater at 10 minutes; and,
  introducing the treating fluid into the formation.

* * * * *